(12) United States Patent
Wise

(10) Patent No.: US 9,184,925 B1
(45) Date of Patent: Nov. 10, 2015

(54) LOCAL EVENT OVERLAYS TO GLOBAL SOCIAL MEDIA NETWORK

(71) Applicant: Maritime Telecommunications Network Inc., Seattle, WA (US)

(72) Inventor: Robert M Wise, Issaquah, WA (US)

(73) Assignee: Maritime Telecommunications Network Inc., Miramar, FL (US)

( * ) Notice: Subject to any disclaimer, the term of this patent is extended or adjusted under 35 U.S.C. 154(b) by 0 days.

(21) Appl. No.: 14/517,409

(22) Filed: Oct. 17, 2014

Related U.S. Application Data (63) Continuation of application No. 14/043,819, filed on Oct. 1, 2013.

(60) Provisional application No. 61/708,178, filed on Oct. 1, 2012, provisional application No. 61/759,927, filed on Feb. 1, 2013, provisional application No. 61/760,268, filed on Feb. 4, 2013, provisional application No. 61/843,955, filed on Jul. 9, 2013.

(51) Int. Cl.
- *G06F 15/16* (2006.01)
- *H04L 12/18* (2006.01)
- *H04L 29/08* (2006.01)

(52) U.S. Cl.
CPC ............ *H04L 12/1813* (2013.01); *H04L 67/12* (2013.01)

(58) Field of Classification Search
USPC .......................................... 709/203, 218, 206
See application file for complete search history.

(56) References Cited

U.S. PATENT DOCUMENTS

| | | | |
|---|---|---|---|
| 2008/0215423 A1* | 9/2008 | Kim ................................ | 705/14 |
| 2010/0121938 A1* | 5/2010 | Saugnac ........................ | 709/218 |
| 2010/0274507 A1* | 10/2010 | Black et al. ...................... | 702/63 |
| 2011/0093519 A1* | 4/2011 | Carricarte et al. ............. | 709/203 |
| 2011/0125924 A1* | 5/2011 | McAleer ........................ | 709/248 |
| 2013/0091212 A1* | 4/2013 | Rajakarunanayake ........ | 709/204 |
| 2013/0097236 A1* | 4/2013 | Khorashadi et al. .......... | 709/204 |
| 2013/0124601 A1* | 5/2013 | Goldman ...................... | 709/203 |
| 2013/0124618 A1* | 5/2013 | Zhong ........................... | 709/203 |
| 2014/0196025 A1* | 7/2014 | Corinella ...................... | 717/178 |
| 2014/0351154 A1* | 11/2014 | Guillama et al. ............. | 705/319 |

* cited by examiner

*Primary Examiner* — David Lazaro
(74) *Attorney, Agent, or Firm* — FSP LLC (57) ABSTRACT

A system includes a local social media context server aboard a vehicle, the local social media context server including logic to implement a local social media context for a passenger aboard the vehicle, the local social media context being configured with a duration commensurate with a duration of a trip by the passenger on the vehicle; an antenna coupled to the local social media context server; and logic to prioritize content posted to the local social media context by the person for promotion to the person's global social media context.

3 Claims, 10 Drawing Sheets

LOCAL EVENT OVERLAYS TO GLOBAL SOCIAL MEDIA NETWORK

PRIORITY CLAIM

The present application claims priority under 35 U.S.C. 119 to application Ser. No. U.S. 61/708,178, filed on Oct. 1, 2012, and under 35 U.S.C. 119 to application Ser. No. U.S. 61/759,927, filed on Feb. 1, 2013, and under 35 U.S.C. 119 to application Ser. No. U.S. 61/760,268, filed on Feb. 4, 2013, and under 35 U.S.C. 119 to application Ser. No. U.S. 61/843, 955, filed on Jul. 9, 2013, each of which is incorporated herein by reference.

BACKGROUND

Passengers on moving vehicles may having limited access to their social media context (e.g., Facebook) and may thus be denied a social media experience during trips. This can occur due to limits on the data contracts or available bandwidth over the length of the trip. This condition can lead to a sense of social isolation or dissatisfaction with the trip.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

The following terminology and acronyms may be used in the description which follows:

CIR: Committed Information Rate—the guaranteed minimum amount of bandwidth committed to a customer, application or remote site MIR: Maximum Information Rate—the maximum amount of bandwidth allocated to a customer, application or remote site based on availability and not guaranteed Bandwidth Pool: A specific segment of bandwidth that is typically shared between multiple customers, sites or ships in a region.

VSAT: Very Small Aperture Terminal

Wireless: includes WIFI, LTE, WIMAX, 3G, 4G and any other wireless communications technologies.

CBM: Central Bandwidth Manager—located in a central data center

LSS: Local Service Selector—located on individual vessels, remote sites or vehicles NMS: Network Management System MCP: Mobile Communications Platform (includes ships, land vehicles (trucks, trains, cars . . . ), and aircraft).

Shore side: Refers to any fixed (non-mobile) location in the area of an MCP.

Priority content: Refers to content that is assigned, via structural modifications to a machine memory, as association with a priority value that indicates the content has priority for purposes of promotion or syncing (e.g., priority with respect to utilization of available network bandwidth and/or machine resources such as memory, processor utilization, etc.).

Instantaneously computed: Refers to a value determined as parameters to a deterministic computation become defined or updated. "Instantaneous" does not require absolute immediacy in time, but does imply that the determined value closely tracks changes in the values of the parameters that determine it.

External network: Refers to a network that is not moving with an MCP, and which is accessed wirelessly via a network bridge or switch device.

Queue: Refers to a first-in, first-out structural arrangement for data flow through a machine memory. Queues have a length which is a number of distinct content items awaiting action in the queue.

Expected delay, Expected bandwidth: Refers (1) to a delay value deterministically computed rather than measured after the delay occurs, (2) to an available machine network bandwidth resource deterministically computed rather than measured as a contemporaneous available network bandwidth.

Passenger account: Refers to settings stored inside a machine system memory that reflect and define assets of a passenger available as compensation to third parties via a settlement machine network (e.g., MasterCard, Visa, Discover, American Express).

Normal content: Refers to content that is not priority content.

Content size: Refers to a count of a memory storage metric such as bits or bytes, where bits or bytes correspond to machine memory cells.

Local social media context: Refers to a machine organization defining content and relationships between content for one or a group of people, the content and relationships limited to a defined circumstance for a trip aboard an MCP.

Global social media context: Refers to a machine organization defining content and relationships between content for one or a group of people, the content and relationships not limited to the circumstances of a particular trip aboard an MCP.

Overlay: Refers to content and relationships from one social media context being superimposed but not completely merged into the content and relationships from another social media context. An overlay is implemented in machine systems by presenting to a user of the system the information from different contexts in an at least partially merged format, while retaining the separateness of the two contexts in the underlying memory configuration of the machine(s).

Sync/Synchronize: Refers to a process of altering relationships and content in one context to fit into another context. This process involves identifying analogous content and/or relationships between the two contexts, updating that content if it is not analogous, and copying non-analogous content from the one context to the other, so that it becomes a native (not overlaid) part of the other context.

Promotion: Copying content and relationships from one context to another, so that it becomes a native part of the other context.

Event Duration: Refers to a time or distance or both between a defined starting point of an event and a defined ending point of an event. Start and ending times for an event may be defined in a machine system as stored values in a machine memory configuration, the stored values corresponding to (for instance) rights of occupancy of a person on an MCP. A "total trip" for instance is the time or distance between when a passenger first embarks on the MCP and when they disembark due to their right of occupancy expiring, or voluntarily before that time.

Social media: Refers to an organized collection of content relating to a person's friendship, family, pets, or other personal or professional life, involving identification of people and relationships between the people at a personal or professional level. The organized content is collectively subject to privacy restrictions specific to the person (user) to whom it all pertains.

Storage: Refers, in reference to content, social media, or settings, to alteration of a machine memory material/energy configuration to reflect values and relationships among those values, where the values translate (directly or indirectly) to quantities, qualities, states, or things in the physical world.

Rules: Refers to a configuration of machine memory defining the machine's behavior when manipulating particular stored information toward a particular result.

Bandwidth: Refers to information transfer capacity over one or more links of a machine communication network.

"Higher" bandwidth refers to conditions when greater amounts of data transfer may be affected over the network, relative to some defined lower bandwidth situation. "Bandwidth allocation" is the process of altering settings in memory of a machine network to associate an amount of bandwidth resources on one or more network links to particular content, people, machines, or machine processes (or combinations of these).

Port: Refers to any location at which an MCP may stop or pause a trip. Usually, passengers of the MCP may disembark at a port.

Bandwidth-limited zone: Refers to a geographical area in which bandwidth is lower relative to a defined other area.

Filter: Refers to a machine-implemented process of applying criteria against content or relationship attributes and selectively identifying which content/relationships meet the criteria and which do not, and taking some action in response to those identifications.

Post/posting: Refers to a process of communicating signals via one machine to another, or via a machine-human interface to internal logic of the machine or a different machine, where the signals identify content to be incorporated into a social media context.

Cache: Refers to temporary storage of content or other social media in a machine memory and association of the content or other data with a social media context, prior to promotion of the content or syncing of the content into a different context.

Crowdsourcing: Refers to establishing machine memory configurations representing attributes and/or relationships between people and content, people and people, or content and people, based upon signals generated via machine interfaces due to activities and actions of a multitude of geographically diverse persons all connected (directly or indirectly) to a common machine communication network.

Content: Refers to organizations of machine memory representing real-world physical phenomenon such as images, audio, music, a sequence of keystrokes, and activities on a machine interface (speech, gestures, drawing, selections, sliders, etc.). Content may be applied to transducers to create visual displays on an optical output device (displays) or to produce vibrations via (for example) speakers.

DESCRIPTION

In one embodiment, the price that a passenger on an MCP pays for priority promoted content is an instantaneously computed price that depends on the length of the queue(s) for normal/priority content transfer to/from the external network. The price quoted or applied to the passenger account may also depend upon an expected delay that will be incurred if the content is promoted normally vs. via priority promotion. The delay may depend on a number of factors including the size of the content the passenger wants to promote between contexts, the length of the various queues involved, and the MCP's actual or expected bandwidth circumstances.

Figure 1:
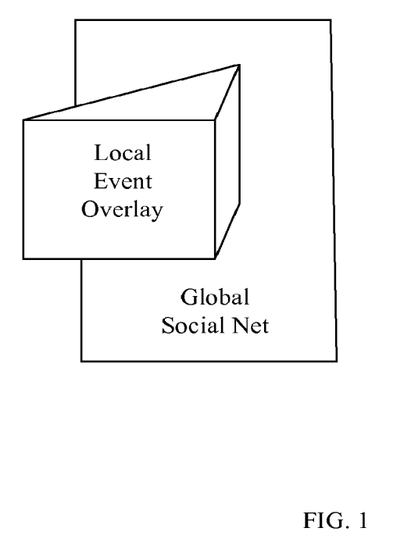
FIG. 1-4 illustrate a local social media context overlayed onto a global social media context, and techniques for promoting content from the global context to the local context, and for syncing content from the local context to the global context.

FIG. 1 is an illustration of an embodiment of a local event social media network, "overlaid" onto a global social media network. A configurable subset of information from the global network is "promoted" into the local network, and a configurable subset of information from the local network is "synced" into the global network. The overlay exits for the duration of an event, which in one embodiment is defined by the duration of a trip using a moving vehicle. Examples of this type of local events are ship, bus, and train tours. This type of local event may persist even when the vehicle stops and a particular passenger disembarks temporally, so long as the total trip has not yet concluded.

The local social media overlay for a particular passenger on the vehicle may include information promoted from the passenger's global social media context, and new media generated during the event and stored into the passenger's local social context. Examples of social media includes information about people, events, comments, photos, and videos. Local social media is synced into the global social media context (e.g., Facebook) according to a set of rules which may be specific to certain conditions onboard the moving vehicle (e.g., location, available bandwidth) and/or specific to particular people in the local or global social context. Global media is promoted into the local social context using another set of rules that are likewise specific to onboard conditions and/or people in the global or local context.

Figure 2:
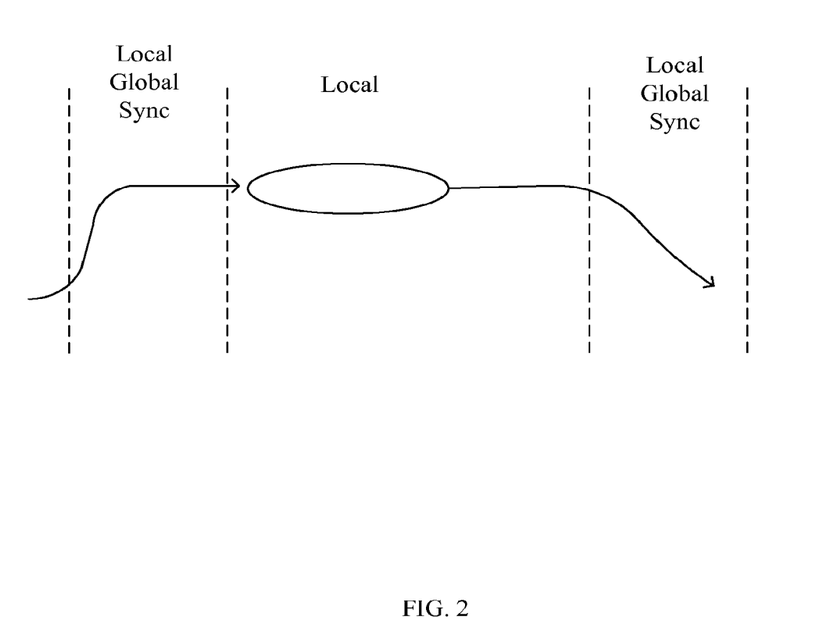
Figure 3:
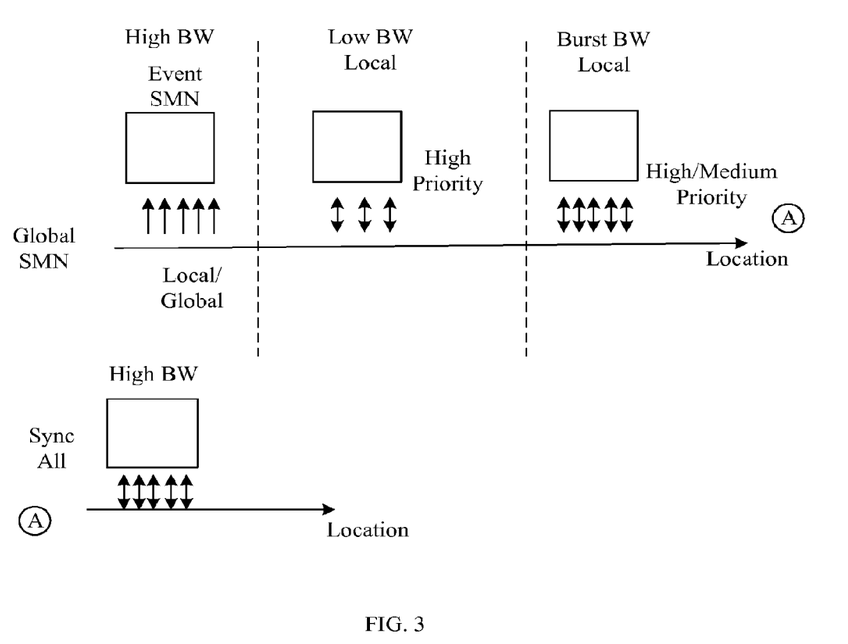
Figure 4:
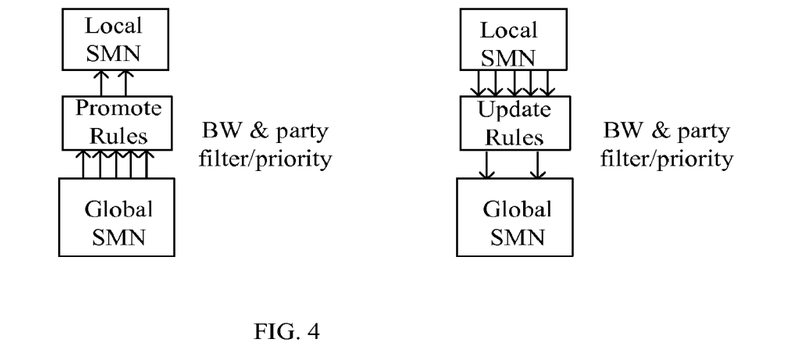

FIG. 2-4 illustrate how the local social media and global social media may be made available to the passenger of a moving vehicle during a first phrase of the trip, for example when higher bandwidth is available near a port. Global social media may be promoted into the local context and stored there for the trip. The moving vehicle into a bandwidth-limited zone and the amount of promotion of new content from the global context, and syncing of new content into the global context, may be affected. In some cases, there is no promotion or syncing of content between the local and global contexts, for example when no bandwidth is available or when the rules of promotion/sync indicate that no content qualifies.

During high bandwidth conditions, synchronization/promotion between the local social media context and the global social media context may be more active because the rules of priority admit more content. Lower priority social media content may be promoted/synced during higher bandwidth conditions. The rules for synchronization from the local context back to the global context may in some embodiments not promote anything back into the global context until the trip for the passenger concludes, or dynamic rules may be established for synchronizing information back from the local media context to the global media context according to the available bandwidth, other trip conditions (such as milestones), and according to priorities for people (e.g., close friends, family, co-workers . . . ), and/or priority for local events (e.g., wedding).

The promotion rules from the global social media context to the local social media context may filter out certain global social media people and events (post types by people in the global context, e.g. location updates may be lower priority than status updates). The promotion/sync rules may be specific to the type of content updates for example, text, images, videos and so on. The text associated with a video or image may be promoted/synced, or the image converted to a thumbnail or icon before promotion/sync. The passenger may define through the rules which aspects of the local media context are finally promoted to their global media context at the end of the trip (e.g., which new friends, which posts, which status updates).

MCP Social Media Context

Figure 5:
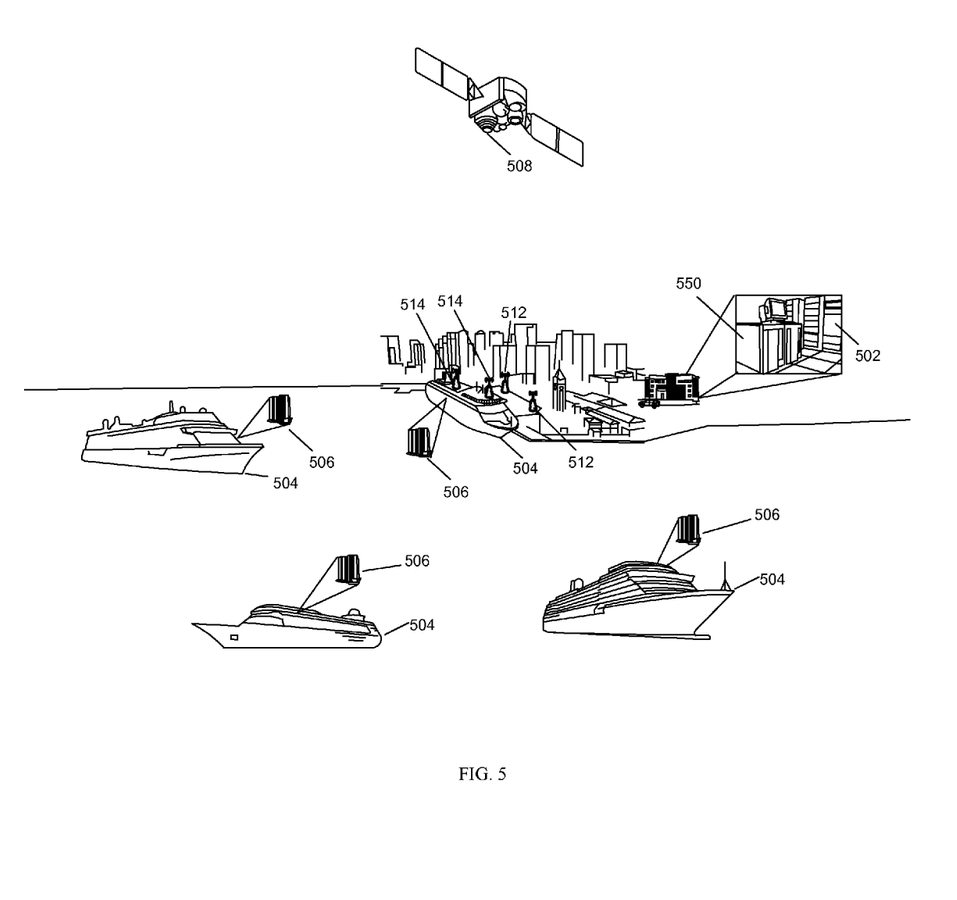
FIG. 5 illustrates an MCP local social media environment.

Referring to FIG. 5, a local social media context for an MCP 504, including bandwidth allocation and connection setup for MCPs 504 utilizing satellite 508 communications, is managed and controlled by two independent but cooperating systems. They are:

1) Central Bandwidth Manager (CBM) 502
2) Local Service Selectors (LSS) 506 that are mobile and located on each MCP 504

The CBM 502 is responsible for the overall monitoring and control of the bandwidth/connection allocation process. The CBM 502 interfaces with various Network Management Systems 510 (like the iDirect NMS), to obtain real-time bandwidth allocation and utilization data at the network, MCP 504 and application levels. The CBM 502 also interfaces with the LSSs 506 on each MCP 504 to determine the status of the connectivity options available to each MCP. The LSS 506 is responsible for making local routing decisions based on real-time connectivity circumstances as well as pre-set rules and thresholds. The LSSs 506 routing decisions can also be driven by commands from the CBM 502. Each MCP 504 may communicate with shoreside antenna 514 via onboard antenna 512.

The connectivity circumstances of a particular MCP may include whether it has access to an alternate connection to the network (e.g., port WiFi), its location, whether it is proximate to another MCP that provides uplink bandwidth, whether it has just arrived to port or will soon depart, predicted weather patterns, passenger count and other considerations, such as:

Bandwidth cost
Link performance and availability
Link latency
MCP itinerary or course
Bandwidth availability
Customer preferences
Network load balance
Proximity to other bandwidth sources (e.g. shore-side WiFi, 3G/4G, other vessels)

Priority Promotion of Content

As described supra, local social media application logic may execute (i.e., be applied to affect the behavior of one or more data processor/controller logic units) to influence the operation of a device of a passenger on an MCP. For example, a local social media application may execute on a laptop computer, cell phone, iPod, or other passenger device, during a limited duration event such as a cruise, a commute, a trip, and so on.

The local social media logic acts as an overlay layer to global social media logic (e.g., databases and application logic for Facebook, Myspace, Twitter, Google Plus, etc.) associated with the passenger. In other words, the local application logic provides a social media context which is local to and limited to the duration of a moving event, such as a cruise, a commute, or a trip. Local social media connections and content are organized, displayed and managed by the local social media application, which also controls the interaction with and content exchange with the global social media application for a particular passenger of the MCP.

During the duration of the moving event or activity, content posted by the passenger to their local social media account may under certain circumstances be promoted to the global social media context of that passenger. However, this typically involves a transfer of data between the MCP and the internet, via which most global social media logic is designed to be accessed. This communication between the MCP and the internet consumes bandwidth, which may be expensive. Bandwidth management and prioritization logic on the MCP may determine which types of local content are provided with priority promotion to the global social media context, and which local content is instead cached in the local social media context of passenger for promotion at a later time. In one embodiment, a payment account of the passenger contains a balance or charge or authorization for a charge for certain amount of value which is correlated to an amount and/or type of content promotions that receive priority bandwidth to the passenger's global context.

The logic aboard the MCP effectively enables a "post-it-now" function whereby certain content posted to the user's local social media content bypasses the MCP outbound cache and is promoted more or less directly to their global social media context via the MCP's internet connection. The post-it-now function may be implemented using a content queue (see FIG. 6) whereby content from multiple passengers of the MCP that is due for promotion enters the queue and is (normally) promoted in the order it is queued. Post it now content bypasses some or all of the content in the normal queue; it is either posted as soon as there is bandwidth on the external network channel; or it enters a priority queue (FIG. 7) that is specifically for priority content (e.g., a post it now queue. The priority queue may be implemented as markers within the normal queue, or in a separately established queue.

Note the term "queue" herein applies to an area of machine memory storage organized to operate as a queue.

The length of the queue and the time delay for the post to the global account will depend on factors including how many passengers are posting promotable content, the size of the posted promotable content, they the bandwidth of the MCP connection to the internet.

Figure 6:
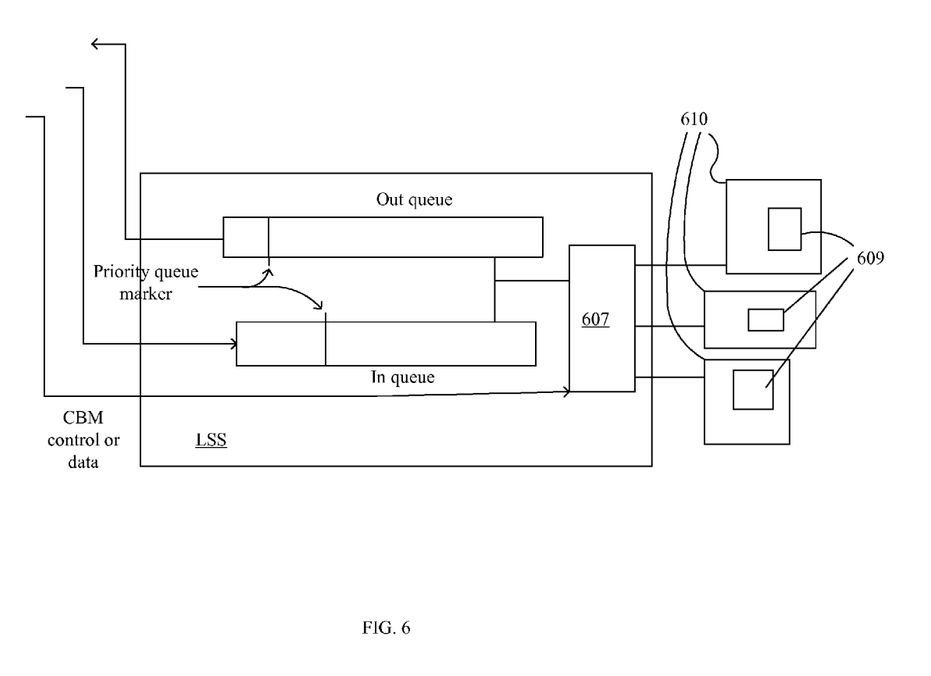
FIG. 6 and FIG. 7 illustrate embodiments of a content promotion system for an MCP.
Figure 7:
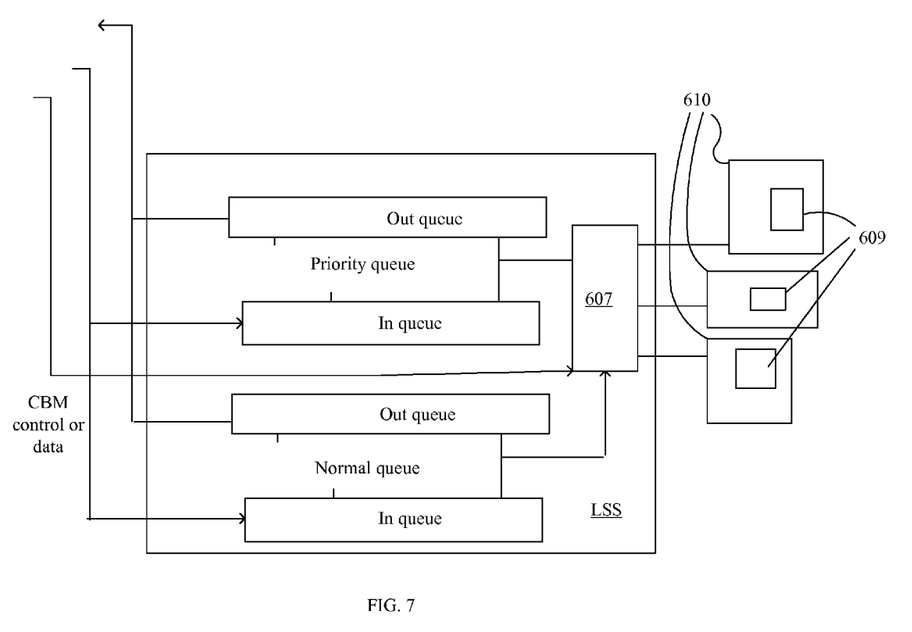

FIG. 6 and FIG. 7 illustrate embodiments of a content promotion system for an MCP. The system interacts with social media application logic 609 of the devices 610 of passengers on the MCP, so that content may be promoted between local and global social media contexts for the passengers via an external (to the MCP) data network. The application logic 609 establishes a communication connection to control logic 607. The control logic 607 monitors factors affecting latency of communications to or from the application logic 609 to a network external to the MCP (or receives control or data related to said factors from the CBM 502). The control logic 607 promotes content from a passenger's local context to their global context, and potentially vice versa, which affects how the content is queued and which is tied to a passenger's payment account.

Input and output queues to a limited bandwidth connection, for example to a satellite, are monitored by control logic 607. The control logic determines placement of a passenger's content in the inbound and/or outbound queues according to a payment model; e.g., a higher price is paid for higher priority placement in the queues.

Variable Pricing for Priority Promotion

In one embodiment, the price that a passenger on an MCP pays for priority promoted content is an instantaneously computed price that depends on the length of the queue(s) for normal/priority content transfer to/from the external network. The price quoted or applied to the passenger account may also depend upon an expected delay that will be incurred if the content is promoted normally vs. via priority promotion. The delay may depend on a number of factors including the size of the content the passenger wants to promote between contexts, the length of the various queues involved, and the MCP's actual or expected bandwidth circumstances.

One factor affecting the price of priority content promotion may be the time expected for the MCP to transition from a lower bandwidth connection, for example a satellite connection, to a higher bandwidth connection, for example a ship to shore WiFi connection which may be anticipated to take place within a computed amount of time based on the MCP trajectory, its speed, and the availability of local access points to the shore from a directional or fixed antenna on the MCP. Thus the priority price may decrease as the MCP draws nearer to a high bandwidth connection that is expected to be available, and may increase as the MCP moves away from such a connection, or as weather conditions worsen, and due to other factors that may increase the expected length of time for content to be promoted normally. The MCP may communicate over a management channel to an on-shore data system (e.g., CBM) which via the satellite may provide the MCP with information about the availability of a higher bandwidth channel, how much bandwidth the MCP can expect to be available on the higher bandwidth channel, and how much bandwidth is available over any backhaul links between the higher bandwidth channel and the internet. The price charged for priority promotion may depend on the size of the content involved. For example, high quality images or video may be quoted a higher price due to the fact that they involve more data transfer, more bytes than a text status update post.

In one embodiment, if the content is below a certain size, such as just a simple text status update, the priority promotion price may not reflect the size of the content but simply a fixed price that does not factor in the size of content, but instead depends on the things like the size of priority queue and the anticipated delay that will be saved over a normal priority content promotion.

Social Media Groups Formed Around Crowd-Sourced Cache Content

Crowdsourcing of content by passengers of a future MCP event onto the MCP cache becomes the basis of forming a local social media group, the duration of which may extend only during the MCP limited duration event, or which may form before the event (as future passengers elect the same content) and extend until the event ends, at which point members of the group may elect to promote the local context (or parts of it) to their global social media context.

Figure 8:
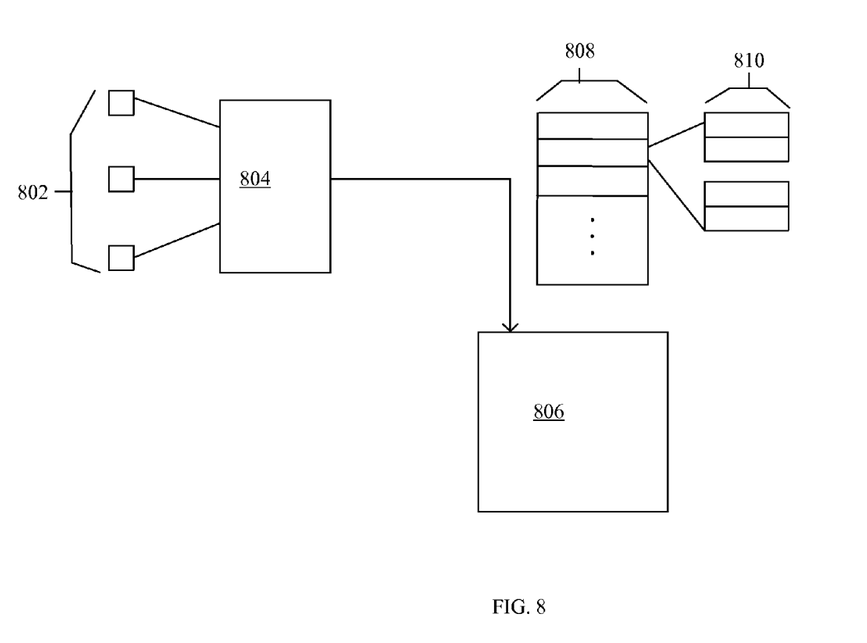
FIG. 8 illustrates an embodiment of a machine communication and processing network for implementing aspects of the described devices and actions.

FIG. 8 illustrates an embodiment of the formation of local social media context based on crowdsource activity of passengers on a future MCP event. Devices 802 utilized by future passengers communicate with a gateway or portal system 804. Each passenger interacts with the portal 804 to vote or contribute small payments in order to promote candidate content 808 into the MCP cache. Thus, each content title in the candidate content set 808 has an associated set 810 of "fans" (e.g., ids of passengers that voted for the content to be cached), and potentially also an amount of money each "fan" is willing to contribute to promote the content into the cache. This amount of money may be utilized by a decision system as an indication of the strength of the fan's affinity to the associated content. Thus, the portal 804 may utilize the voting behavior and contribution behavior (or only one or the other) to form a local social media context 806 for the passengers that are participating. This local context 806 may be utilized to form social media groups for the MCP limited duration event, where the links of the local social media context 806 (determination and/or strengths of friendships or associations, etc.) may be determined by common interest in or affinity to certain content ascertained from the crowdsource behavior of passengers in promoting content onto the MCP cache prior to the event.

Figure 9:
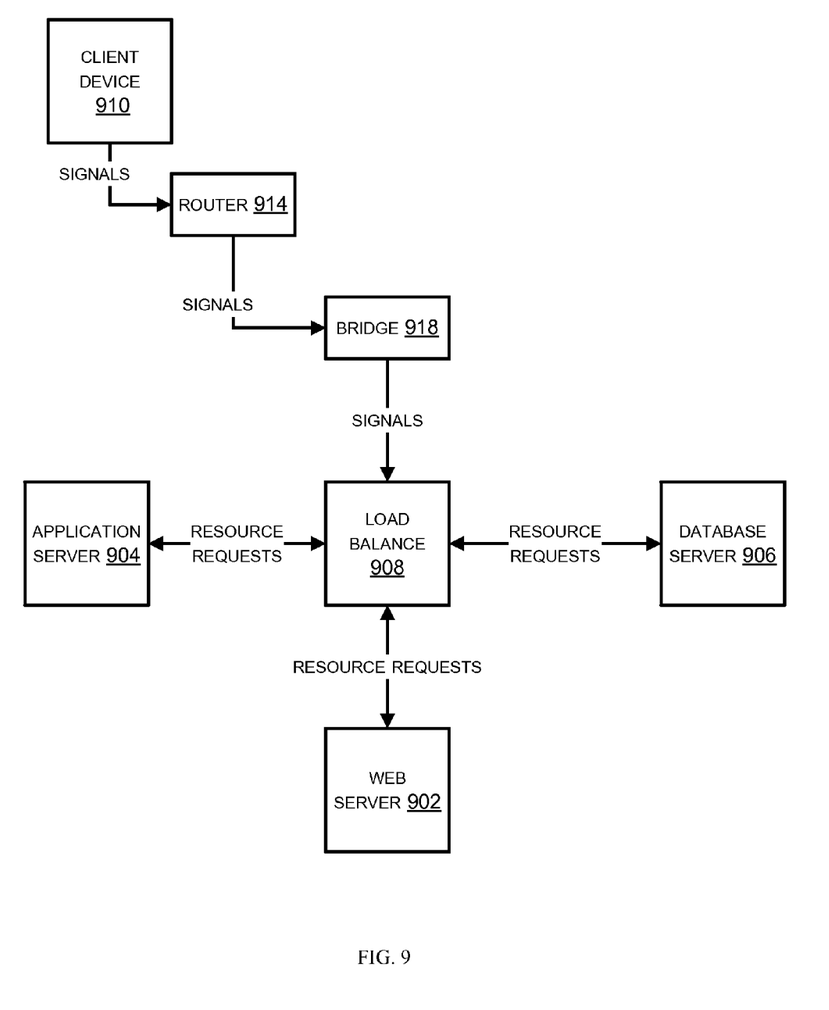
FIG. 9 illustrates an embodiment of a machine communication and processing network for implementing aspects of the described devices and actions.

FIG. 9 illustrates an embodiment of a machine communication and processing network for implementing aspects of the described devices and actions. A client device 910 outputs and receives signals in Internet protocol (IP) format. The signals are exchanged via a router 914 and a bridge 918 with a server system. The server system comprises a number of separate server devices, typically each implemented in the separated machine, although this is not necessarily the case. The signals from the client devices 910 are provided via a load balancing server 908 to one or more application server 904 and one or more database server 916. Load balancing server 908 maintains an even load in terms of requests in signals to the various other servers in the system including web server 902, application server 904, and database server 906. Each server may represent in effect multiple servers of that type.

The signals from the client devices 910 influence one or more processors of the application server 904 to interact with a local social media context, or to promote/sync content between a person's local and global social media contexts. The database server 906 may provide signals in response to resource requests related to content of the local or global social media context, such as images, text, video, or audio. The signals applied to the database server 906 may cause one or more CPU of the database server 906 to access certain addresses, which correlates to certain rows and columns in a data organization in machine memory. These signals from the database server 906 may also be applied to application server 904 via the load balancing server 908 to influence the organization and presentation of a social media context (for example, via the web server 902) via signals to the client device 910.

The machine network of FIG. 9 may be implemented onboard an MCP, with one or more LSS implementing the server group. The machine network may also be implemented as a global Internet service accessed by the MCP over a wireless communication interface (e.g., via satellite, 4G, or hi-speed WiFi).

Figure 10:
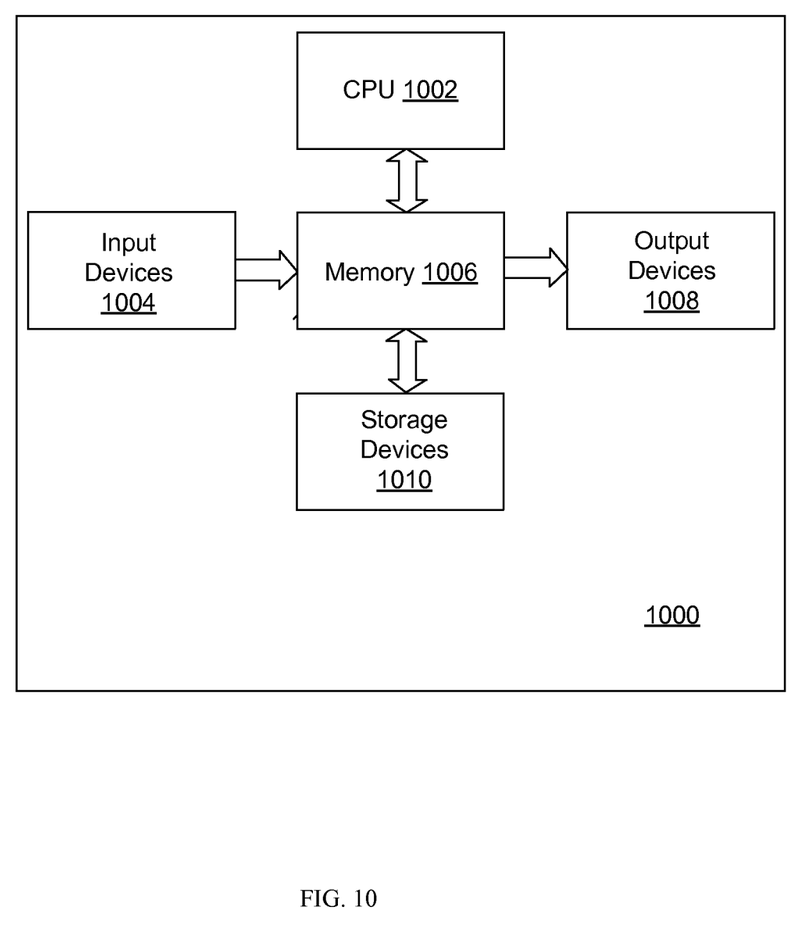
FIG. 10 illustrates an embodiment of a machine device which can implement various actions described herein (either client or server or intermediate device).

FIG. 10 illustrates an embodiment of a machine device which can implement various actions described herein (either client or server or intermediate device). Input devices 1004 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1004 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1004 are provided via various machine signal conductors (e.g., busses or network interfaces) and circuits to memory devices 1006. The memory devices 1006 is typically what is known as a first or second level memory device, providing for storage (via configuration of matter or states of matter) of signals received from the input devices 1004, instructions and information for controlling operation of the CPU 1002, and signals from storage devices 1010. Information stored in the memory devices 1006 is typically directly accessible to processing logic 1002 of the device. Signals input to the device cause the reconfiguration of the internal material/energy state of the memory device 1006, creating in essence a new machine configuration, influencing the behavior of the device 1000 by affecting the behavior of the CPU 1002 with control signals (instructions) and data provided in conjunction with the control signals. Second or third level storage devices 1010 may provide a slower but higher capacity machine memory capability. Examples of storage devices 1010 are hard disks, optical disks, large capacity flash memories or other non-volatile memory technologies, and magnetic memories. The processing logic 1002 may cause the configuration of the memory 1006 to be altered by signals in storage devices 1010. In other words, the CPU 1002 may cause data and instructions to be read from storage devices 1010 in the memory 1006 from which may then influence the operations of CPU 1002 as instructions and data signals, and from which it may also be provided to the output devices 1008. The CPU 1002 may alter the content of the memory of 1006 by signaling to a machine interface of memory 1006 to alter the internal configuration, and then converted signals to the storage devices 1010 to alter its material internal configuration. In other words, data and instructions may be backed up from memory 1006, which is often volatile, to storage devices 1010, which are often non-volatile. Output devices 308 are transducers which convert electrical, optical, or wireless signals into physical phenomenon such as vibrations in the air, or patterns of light on a machine display, or vibrations (i.e., hepatic devices) or patterns of ink or other materials (i.e., printers and 3-D printers).

Implementations and Alternatives

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A system comprising:
  a local social media context server aboard a vehicle, the local social media context server comprising logic to implement a local social media context for a passenger aboard the vehicle, the local social media context being configured with a context duration commensurate with a trip duration of a trip by the passenger on the vehicle;
  an antenna coupled to the local social media context server;
  logic to prioritize content posted to the local social media context by the person passenger for promotion via the antenna to a global social media context for the passenger; and
  logic to overlay content of the local social media context onto a display comprising the global social media context.

2. A process comprising:
  implementing on a local social media context server aboard a vehicle a local social media context for a passenger aboard the vehicle, the local social media context being configured with a context duration commensurate with a trip duration of a trip by the passenger on the vehicle;
  operating an antenna coupled to the local social media context server; prioritizing content posted to the local social media context by the passenger for promotion via the antenna to a global social media context for the passenger; and
  operating a display to overlay content of the local social media context onto content of the global social context.

3. A server comprising:
  logic to implement a local social media context for a passenger aboard a vehicle, the local social media context being configured with a context duration commensurate with a trip duration of a trip by the passenger on the vehicle;
  a communication interface to an antenna;
  logic to prioritize content posted to the local social media context by the passenger for promotion via the antenna to a global social media context for the passenger; and
  logic to overlay content of the local social media context onto a display comprising the global social media context.

* * * * *